United States Patent
Yang

(10) Patent No.: US 6,687,830 B2
(45) Date of Patent: Feb. 3, 2004

(54) ENERGY-SAVING CONTROL INTERFACE AND METHOD FOR POWER-ON IDENTIFICATION

(75) Inventor: Wu-Chih Yang, Hsinchu (TW)

(73) Assignee: Winbond Electronics Corp. (TW)

( * ) Notice: Subject to any disclaimer, the term of this patent is extended or adjusted under 35 U.S.C. 154(b) by 597 days.

(21) Appl. No.: 09/768,087

(22) Filed: Jan. 23, 2001

(65) Prior Publication Data
US 2002/0099965 A1 Jul. 25, 2002

(51) Int. Cl.[7] .................................................. G06F 1/28
(52) U.S. Cl. ........................ 713/200; 713/320; 713/324
(58) Field of Search ................................. 713/200, 202, 713/300–340, 502

(56) References Cited

U.S. PATENT DOCUMENTS 5,180,902 A * 1/1993 Schick et al. ............... 235/380
5,987,614 A * 11/1999 Mitchell et al. ............. 713/300
6,115,823 A * 9/2000 Velasco et al. .............. 713/322

* cited by examiner

Primary Examiner—Thomas M. Heckler
(74) Attorney, Agent, or Firm—Jackson Walker L.L.P.

(57) ABSTRACT

An energy-saving control interface for power-on identification utilizes a first switch to start to sense and identify data. A second switch is connected to a sensing/scanning circuit for powering off the sensing/scanning circuit when a timer has reached its count. A third switch is used to control whether to supply power to a security control unit, wherein the security control unit is supplied with power immediately when the sensing/scanning circuit completes data identification. A power supply is connected with a fourth switch controlled by a confirmation signal from the security control unit, such that the security control unit determines whether to activate the power supply.

12 Claims, 2 Drawing Sheets

ENERGY-SAVING CONTROL INTERFACE AND METHOD FOR POWER-ON IDENTIFICATION

BACKGROUND OF THE INVENTION

1. Field of the Invention

The present invention relates to an energy-saving control interface and method for power-on identification, which enable a computer to utilize the standby power for performing an identification process to power on the computer.

2. Description of Related Art

Currently, a computer device is always installed with a power supply for providing the working power thereto. The conventional power supply is made by a well-known switching power technique to have the advantages of high efficiency and light weight. Such a power supply is also known as a switching power supply. However, because of the advances in computer technology, a new generation of power supply, known as ATX power supply, has been in widely spread use to meet the requirements of remote control and power management. In addition to being turned on and off by receiving signals, such a power supply is characterized in providing a standby power (5V power with a current of approximately 0.7 amps) when the power supply is off. The standby power is provided to supply power, when the computer is powered off, to various components in the computer, such as the internal modem, network card or other interface cards, so as to remotely power on the computer via the modem, network card, etc. However, such a standby power can only supply a small amount of current, and thus it can not be used as a power source for other computer devices. Accordingly, there is a serious limitation in the application of the standby power.

If it is desired to use a fingerprint identification device or the like to control the power-on operation of the computer, it would be difficult to integrate the device with the computer as the standby power of the computer is too small to drive the device to work. Therefore, it is desirable to be able to control a device integrated with the computer by the low-current standby power.

SUMMARY OF THE INVENTION

The object of the present invention is to provide an energy-saving control interface and method for power-on identification, which enable a computer to utilize the standby power for performing an identification process to power on the computer.

In accordance with one aspect of the present invention, the energy-saving control method of the present invention includes the steps of: (a) providing a sensing/scanning circuit for obtaining identification data; (b) providing an output interface for receiving and storing the identification data from the sensing/scanning circuit, and providing a clock signal; (c) providing a security control unit for receiving the identification data from the output interface to compare with pre-stored identification data and selectively send out a correct confirmation signal and an incorrect confirmation signal; (d) providing a control interface for receiving the clock signal from the output interface to determine whether to supply power to the security control interface; (e) providing a power supply which is triggered to supply power by receiving the correct confirmation signal from the security control unit; (f) activating a switch to supply power to the output interface; (g) supplying power to the sensing/scanning circuit for a time duration determined by a timer after the output interface is powered on; and (h) supplying power to the security control unit when the timer reaches its count, and, when the security control unit has sent the confirmation signal, the output interface and security control unit are powered off immediately.

In accordance with another aspect of the present invention, the energy-saving control interface for power-on identification has a feature input device, a first switch, a second switch, a security control unit, a control interface, and a power supply. The feature input device has a sensing/scanning circuit and an output interface. The output interface has a data memory for storing data obtained by the sensing/scanning circuit, and an interface controller for transmitting data and clock signals. The first switch is connected between the feature input device and a power input for being activated to start to sense and identify data. The second switch is connected between the sensing/scanning circuit and the first switch for powering off the sensing/scanning circuit when a timer has reached its count. The security control unit has a digital signal processor and a data memory pre-stored with identification data for comparing the data sent from the output interface with the pre-stored identification data, so as to selectively send out a correct confirmation signal or an incorrect confirmation signal. The control interface has a third switch which is turned on by the clock signal from the feature input, so as to control whether to supply power to the security control unit, wherein the security control unit is supplied with power immediately when the sensing/scanning circuit completes data identification. The power supply has an input connected with a fourth switch controlled by the confirmation signal from the security control unit, such that the security control unit determines whether to activate the power supply. Other objects, advantages, and novel features of the invention will become more apparent from the following detailed description when taken in conjunction with the accompanying drawings.

DETAILED DESCRIPTION OF THE PREFERRED EMBODIMENT

Figure 1:
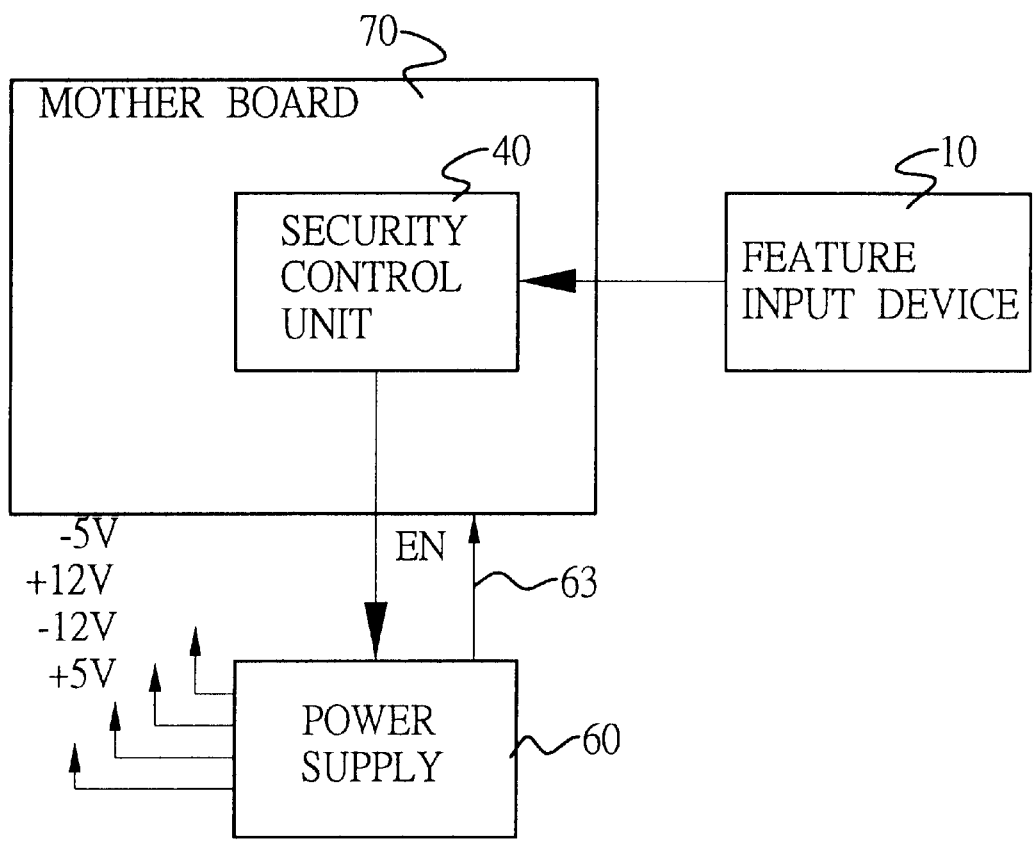
FIG. 1 schematically illustrates the use of the energy-saving control interface for performing a power-on identification in accordance with the present invention.

FIG. 1 schematically illustrates a preferred embodiment of the present invention, which integrates an identification device, for example a fingerprint identification device, with a computer, so as to perform power-on and power-off operations of the computer. As shown, a security control unit 40 is provided on a computer motherboard 70 for receiving signals from a feature input device 10. The received signal is compared with the pre-stored fingerprint data in the security control unit 40. If matched, the security unit 40 sends an enable signal, denoted by EN, to a power supply 60 of the computer, so as to command the power supply 60 to supply various powers to the motherboard 70 for starting up the computer. As such, a computer can be powered on with the use of fingerprint identification.

Figure 2:
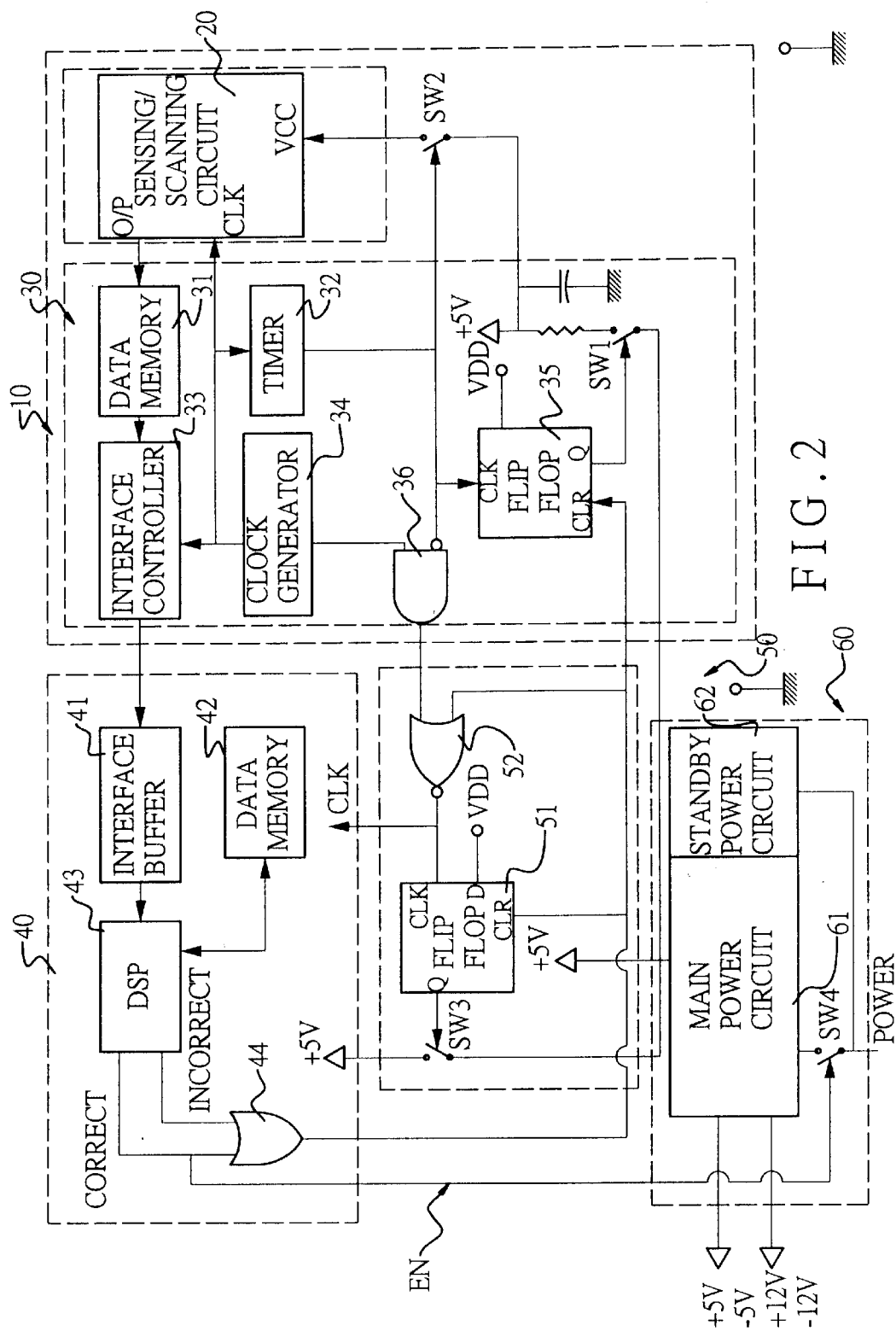
FIG. 2 is a block diagram showing the energy-saving control interface in accordance with the present invention.

In order to operate the feature input device 10 and the security control unit 40 with only +5V, standby power 63 of the power supply 60, an energy-saving control interface is provided, as shown in FIG. 2, which includes the power supply 60, the feature input device 10 having a sensing/ scanning circuit 20 and an output interface 30, the security control unit 40 and a control interface 50. The power supply 60 has a main power circuit 61 and a standby power circuit 62. The main power circuit 61 is connected to a manual-off switch SW4 that can be turned on by the enable signal EN. The output terminals of the main power circuit provide the necessary power to operate the computer, while the power output terminal of the standby power circuit 62 is connected to the control interface 50, so as to enable or disable the security control unit 40, the output interface 30 and the sensing/scanning circuit 20 by controlling an electronic switch SW3 in the control interface 50 and manual-on switches SW1 and SW2 in the feature input device 10.

The control interface 50 is composed of a logic gate 52, a flip-flop 51 and the electronic switch SW3. The security control unit 40 is composed of an interface buffer 41, a data memory 42, a digital signal processor 43 and a logic gate 44. The output interface 30 of the feature input device 10 is composed of a data memory 31, a timer 32, an interface controller 33, a clock generator 34, a flip-flop 35 and a logic gate 36. The switch SW1 in the output interface 30 can be manually turned on by depressing, and locked in the on status by a signal from output Q of the flip-flop 35. The switch SW1 is used to determine whether the power is supplied to the output interface 30 or not. Its output is connected to the power terminal (VCC) of the sensing/scanning circuit 20 via the switch SW2, controlled by a timer 32, so as to determine whether the power is supplied to the sensing/scanning circuit 20. The switch SW3 is controlled by the flip-flop 51 in the control interface 50 to determine whether the power is supplied to the security control unit 40.

The data output from the output terminal (O/P) of the sensing/scanning is sent to the digital signal processor 43, via the data memory 31, the interface controller 33 and the interface buffer 41 of the security control unit 40, for comparing with the data sent from the data memory 42 pre-stored with fingerprint data or other identification data. Thereafter, a correct (Y) or incorrect (N) confirmation signal is generated. The correct signal is provided as the enable (EN) signal for turning on the switch SW4 in the power supply 60, so as to achieve the purpose of activating the main power circuit 61. The clock signals for the circuit are supplied by the clock generator 34 in the output interface 30. In detail, the clock signals from the output of the clock generator are applied to the interface controller 33, timer 32 and sensing/scanning circuit 20, and also applied to the security control unit 40 and the flip-flop 51 in the control interface 50 via the logic gates 36 and 52.

In order to perform fingerprint or other kinds of identification, the user may put his/her finger on a sensor corresponding to the sensing/scanning circuit 20. Then, the switch SW1 is turned on manually, so as to supply the standby power of the power supply 60 to the output interface 30. At this moment, the clock generator 34 is triggered and the timer 32 starts to count. The output of the timer 32 is a step pulse with a duration of 1~2 seconds. Such a duration time can be adjusted based on the actual requirement. The step pulse is used to turn on the switch SW2 and thus activate the sensing/scanning circuit 20 for 1~2 seconds, so as to perform the operations of fingerprint identification and data transfer. The step pulse is also applied to the flip-flop 35 for locking the switch SW1 in the on status, thereby preventing a power failure.

After the above scanning process is completed, the sensed data is directly sent to the data memory 31 to be buffered. When the timer reaches its count, the sensing/scanning circuit 20 is automatically powered off by the switch SW2 for saving energy. At this moment, the clock signal is sent to the control interface 50 via the logic gate 36, and transferred to the security control unit 40 via another logic gate 52. The clock signal also triggers the flip-flop 51 to turn on the switch SW3 for supplying power to the security control unit 40. Therefore, the security control unit 40 obtains its power and clock signal for receiving the fingerprint data sent from the output interface 30. After the security control unit 40 has compared the received data with the pre-stored one, the confirmation signal, no matter correct or incorrect, is applied, via the logic OR gate 44, to clear the two flip-flops 35 and 51, so as to turn off the switch SW1 and SW3, thereby most of the circuit elements being powered off. When another power-on identification process is initiated, the above process is repeated.

When the security control unit 40 determines that the received data is matched with a pre-stored one, it automatically turns on the switch SW4 to activate the power supply 60, so as to power on the computer as usual. If the computer is to be powered off, as well known to those skilled in the art, the computer may be automatically powered off by its operating system, one may be manually turned off by operating the switch SW4.

In view of the foregoing, it is appreciated that the energy-saving control interface is able to power off the unnecessary circuit elements at suitable times in performing fingerprint identification, so the entire power requirement can meet the specification of the standby power. Such an interface design can also be applied to the portable computer and battery device to have the same functions.

Although the present invention has been explained in relation to its preferred embodiment, it is to be understood that many other possible modifications and variations can be made without departing from the spirit and scope of the invention as hereinafter claimed.

What is claimed is:

1. An energy-saving control method for power-on identification, comprising the steps of:

providing a sensing/scanning circuit for obtaining identification data;

providing an output interface for receiving and storing the identification data from the sensing/scanning circuit, and providing a clock signal;

providing a security control unit for receiving the identification data from the output interface to compare with pre-stored identification data and selectively send out a correct confirmation signal or an incorrect confirmation signal;

providing a control interface for receiving the clock signal from the output interface to determine whether to supply power to the security control unit;

providing a power supply which is triggered to supply power by receiving the correct confirmation signal from the security control unit;

activating a switch to supply power to the output interface;

supplying power to the sensing/scanning circuit for a time duration determined by a timer after the output interface is powered on; and supplying power to the security control unit when the timer reaches its count, and, when the security control unit has sent the confirmation signal, the output interface and security control unit are powered off immediately.

2. The energy-saving control method for power-on identification as claimed in claim 1, wherein the output interface has the timer for producing a step pulse signal.

3. The energy-saving control method for power-on identification as claimed in claim 1, wherein the output interface includes a flip-flop having an output for controlling a switch, such that, when the switch is turned on, the switch is locked in an on status by signal output from the flip-flop.

4. The energy-saving control method for power-on identification as claimed in claim 1, wherein the control interface has a logic gate and a flip-flop, the logic gate receiving the clock signal from the output interface for being transmitted to the flip-flop, the flip-flop having an output connected to a switch for determining whether to supply power to the security control unit.

5. The energy-saving control method for power-on identification as claimed in claim 3, wherein the flip-flop is cleared when the security control unit issues the confirmation signal.

6. The energy-saving control method for power-on identification as claimed in claim 4, wherein the flip-flop is cleared when the security control unit issues the confirmation signal.

7. An energy-saving control interface for power-on identification, comprising:
- a feature input device having a sensing/scanning circuit and an output interface, the output interface having a data memory for storing data obtained by the sensing/scanning circuit, and an interface controller for transmitting data and clock signals;
- a first switch connected between the feature input device and a power input for being activated to start to sense and identify data;
- a second switch connected between the sensing/scanning circuit and the first switch for powering off the sensing/scanning circuit when a timer has reached its count;
- a security control unit having a digital signal processor and a data memory pre-stored with identification data for comparing the data sent from the output interface with the pre-stored identification data, so as to selectively send out a correct confirmation signal or an incorrect confirmation signal;
- a control interface having a third switch which is turned on by the clock signal from the feature input, so as to control whether to supply power to the security control unit, wherein the security control unit is supplied with power immediately when the sensing/scanning circuit completes data identification; and
- a power supply having an input connected with a fourth switch controlled by the confirmation signal from the security control unit, such that the security control unit determines whether to activate the power supply.

8. The energy-saving control interface for power-on identification as claimed in claim 7, wherein the output interface has the timer for producing a step pulse signal.

9. The energy-saving control interface for power-on identification as claimed in claim 7, wherein the output interface includes a flip-flop having an output for controlling the first switch, such that, when the first switch is turned on, the first switch is locked in an on status by signal output from the flip-flop.

10. The energy-saving control method for power-on identification as claimed in claim 9, wherein the flip-flop is cleared when the security control unit issues the confirmation signal.

11. The energy-saving control interface for power-on identification as claimed in claim 7, wherein the control interface has a logic gate and a flip-flop, the logic gate receiving the clock signal from the output interface for being transmitted to the flip-flop, the flip-flop having an output connected to the third switch for determining whether to supply power to the security control unit.

12. The energy-saving control method for power-on identification as claimed in claim 11, wherein the flip-flop is cleared when the security control unit issues the confirmation signal.

* * * * *